(12) United States Patent
Warncke et al.

(10) Patent No.: US 9,649,881 B2
(45) Date of Patent: May 16, 2017

(54) CASTER WHEEL

(71) Applicant: Sauder Manufacturing Co., Archbold, OH (US)

(72) Inventors: Anthony J. Warncke, Archbold, OH (US); Timothy J. Johnson, Archbold, OH (US); Joel D. Alberda, Leo, IN (US)

(73) Assignee: Sauder Manufacturing Co., Archbold, OH (US)

( * ) Notice: Subject to any disclaimer, the term of this patent is extended or adjusted under 35 U.S.C. 154(b) by 34 days.

(21) Appl. No.: 14/731,800

(22) Filed: Jun. 5, 2015

(65) Prior Publication Data

US 2016/0355053 A1    Dec. 8, 2016

(51) Int. Cl.
*B60B 33/00* (2006.01)
*B60B 33/02* (2006.01)

(52) U.S. Cl.
CPC ............ *B60B 33/02* (2013.01); *B60B 33/006* (2013.01)

(58) Field of Classification Search
CPC ........ B60B 33/02; B60B 33/006; B60B 33/00
USPC ................................................ 16/20, 46, 48
See application file for complete search history.

(56) References Cited

U.S. PATENT DOCUMENTS

| | | | | |
|---|---|---|---|---|
| 4,054,965 | A * | 10/1977 | Vig | B60B 33/02 16/35 D |
| 4,887,824 | A * | 12/1989 | Zatlin | A63C 17/004 16/35 D |
| 7,383,611 | B2 * | 6/2008 | Foster | B60B 33/0039 16/20 |
| 8,490,242 | B2 * | 7/2013 | Cooper | B60B 33/0005 16/18 R |

* cited by examiner

*Primary Examiner* — Roberta Delisle
(74) *Attorney, Agent, or Firm* — McGarry Bair PC

(57) ABSTRACT

A caster wheel comprising a wheel mount and a bearing plate, both having a pivot pin extending through them such that the wheel mount may pivot relative to the bearing plate. The wheel mount and bearing plate both have at least two magnets each, arranged such that pivoting movement of the wheel mount may position the magnets in registry with one another. The magnetic attraction between the magnets further attracts the wheel mount and bearing plate into registry with one another, aligning an article to which the caster wheel mounts in a straight direction.

18 Claims, 6 Drawing Sheets

CASTER WHEEL

BACKGROUND OF THE INVENTION

Articles of furniture can be configured to include wheels between the furniture and a floor that supports the furniture. These wheels enable the easy movement of the furniture relative to the supporting floor. Example furniture can include, but is not limited to, chairs, tables, beds, and the like. The wheels may further pivot relative to the furniture, facilitating turning of the furniture as it is moved. Often, as the wheels pivot to turn the furniture, the wheels become oriented such that returning to a straight, forward direction is difficult, creating problems for a person moving the furniture or a poor experience for a person using the furniture as it moves.

BRIEF DESCRIPTION OF THE INVENTION

In one aspect, a caster wheel includes a wheel mount having a wheel rotatably mounted to an axle being secured to the wheel mount, with an upper mount member having a wing extending laterally from each of opposite sides of the wheel mount, and a pivot pin extending normal to the axle through the upper mount member. The caster wheel has a bearing plate adapted to affix to an article, wherein the pivot pin is rotatably mounted to the bearing plate. There are at least two wheel mount magnets mounted in the upper mount member with one wheel mount magnet in each wing and at least two bearing plate magnets mounted in the bearing plate, wherein each bearing plate magnet is positioned to be in registry with a wheel mount magnet when the wheel mount is pivoted relative to the bearing plate with the wheel pointed in a first direction. The poles of the wheel mount magnets are opposite from the poles of the bearing plate magnets with which they are in registry so that the wheel mount will tend to pivot relative to the bearing plate to maintain the wheel pointed in the first direction.

In another aspect, an article of furniture has caster wheels, wherein one or more caster wheels includes a wheel mount having a wheel rotatably mounted to an axle being secured to the wheel mount, with an upper mount member having a wing extending laterally from each of opposite sides of the wheel mount, and a pivot pin extending normal to the axle through the upper mount member. The caster wheel has a bearing plate adapted to affix to an article, wherein the pivot pin is rotatably mounted to the bearing plate. There are at least two wheel mount magnets mounted in the upper mount member with one wheel mount magnet in each wing and at least two bearing plate magnets mounted in the bearing plate, wherein each bearing plate magnet is positioned to be in registry with a wheel mount magnet when the wheel mount is pivoted relative to the bearing plate with the wheel pointed in a first direction. The poles of the wheel mount magnets are opposite from the poles of the bearing plate magnets with which they are in registry so that the wheel mount will tend to pivot relative to the bearing plate to maintain the wheel pointed in the first direction.

DESCRIPTION OF EMBODIMENTS OF THE INVENTION

The invention may be implemented in any environment wherein a unit, such as a box, container, bin, or article of furniture is configured to move relative to a supporting floor, utilizing one or more wheels. For purposes of this description, such movable unit will be generally referred to as a wheelchair or similar language. However, embodiments of the disclosure can be equally suitable for any movable unit in a residential, industrial, or medical setting.

Figure 1:
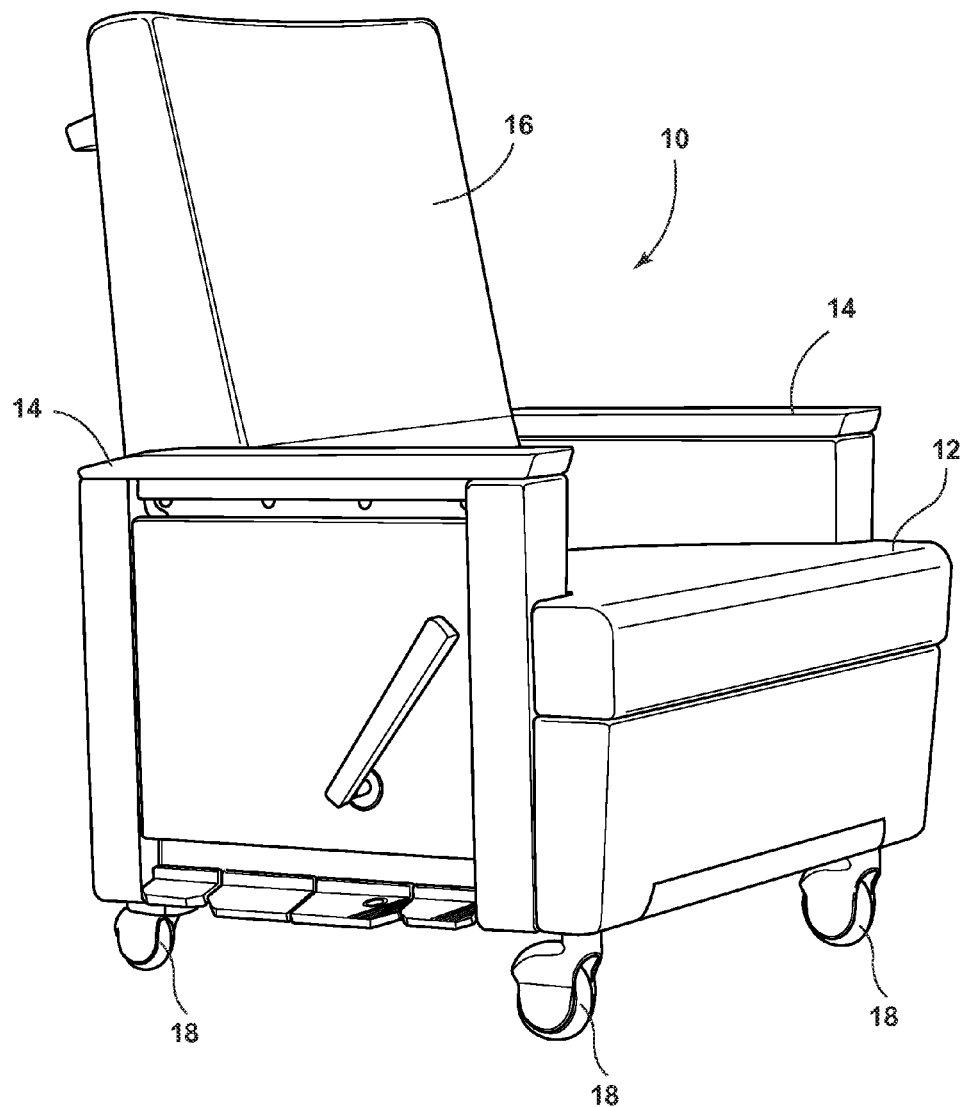
FIG. 1 illustrates an article of furniture with caster wheels on the bottom.

Turning to FIG. 1, an article 10, shown as a wheelchair, comprises general chair components including a seat 12, arms 14, back 16, and wheels comprising caster wheels 18. Four caster wheels 18 mount to the bottom of the wheelchair 10 generally disposed near each bottom corner of the wheelchair 10. The caster wheels 18 support the wheelchair 10 on a floor (not shown) and permit movement of the wheelchair 10 relative to the floor. In further embodiments, any number of caster wheels 18 may mount to the bottom of the wheelchair 10 and may mount anywhere along the bottom of the wheelchair 10 such as, for example, the center of the wheelchair 10. In further embodiments, caster wheels 18 may be used in combination with other wheels, such as standard wheelchair wheels permitting user-driven movement.

Figure 2:
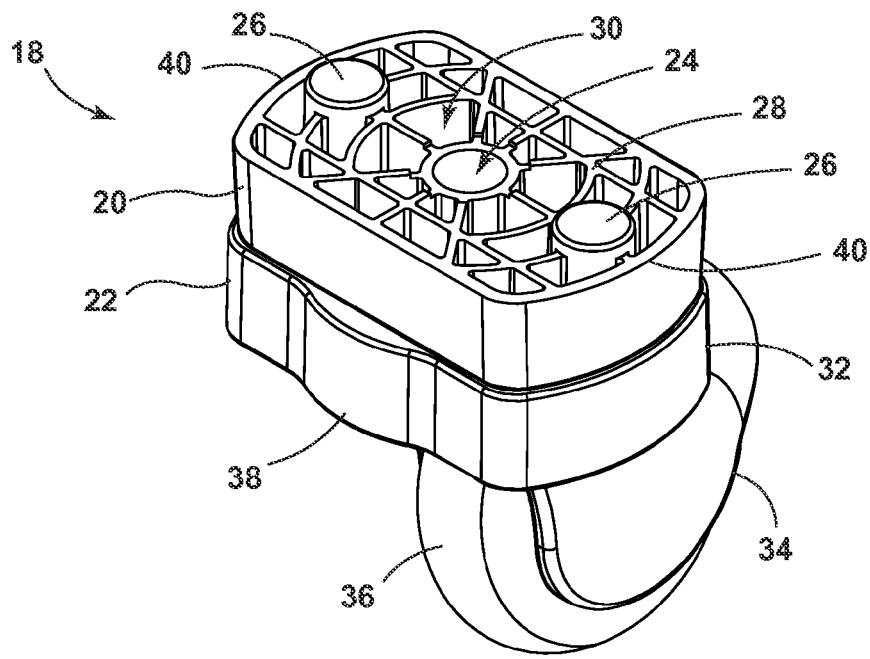
FIG. 2 illustrates a top perspective view of the caster wheel having the wheel mount and bearing plate in registry with one another.

FIG. 2 shows the caster wheel 18 comprising a bearing plate 20 and a wheel mount 22 in registry with one another, best showing the bearing plate 20. The bearing plate 20 and wheel mount 22 may affix to one another by the insertion of a pivot pin (see FIG. 6) which may insert through a pivot hole 24 extending through them. The bearing plate 20 may be injection molded as a single unit, comprising a system of structure walls 28 defining a series of recesses 30 and may comprise non-magnetic material. The bearing plate 20 comprises an elliptical shape with a set of two bearing members 40 extending on either side of the pivot hole 24. Each bearing member 40 comprises a magnet housing 26 formed within the system of walls 28 for receiving a magnet as well as aligning the bearing plate 20 relative to the article and preventing pivoting movement of the bearing plate 20 when mounted to the article.

Figure 3:
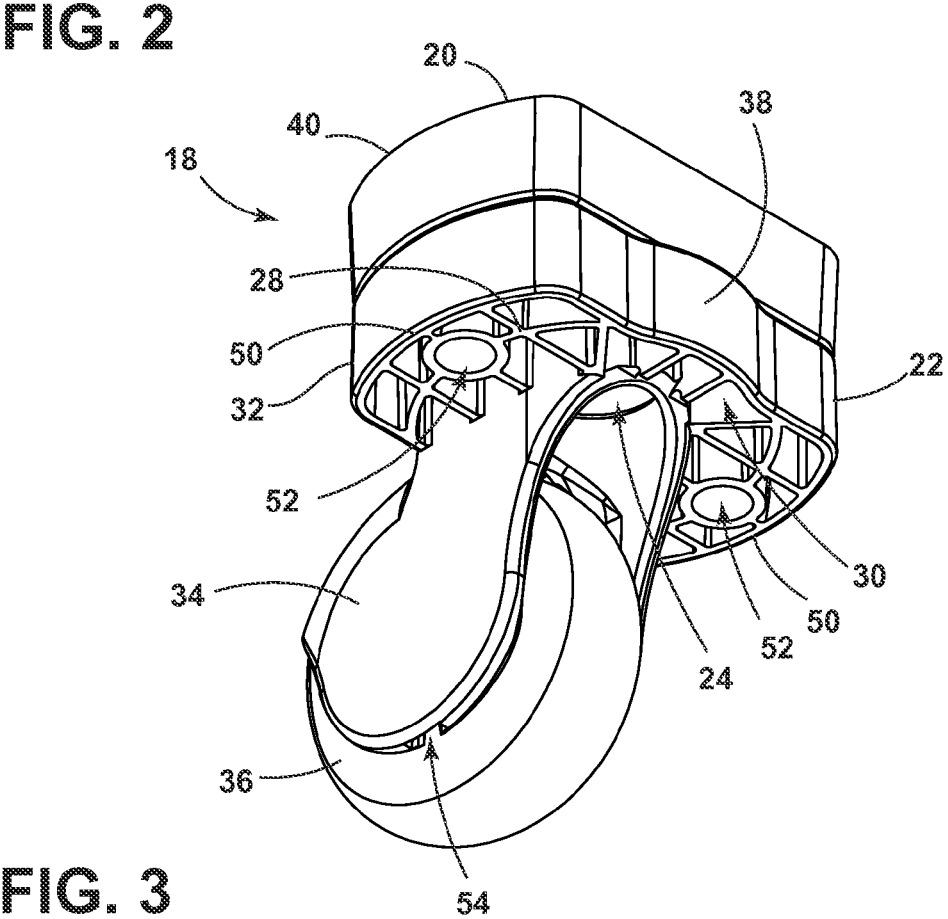
FIG. 3 illustrates a bottom perspective view of the caster wheel having the wheel mount and bearing plate in registry with one another.

The wheel mount 22 may comprise an upper member 32 and a lower member 34. The upper member 32 may further comprise a lip 38 while a wheel 36 mounts within the lower member 34. Turning to FIG. 3, the wheel mount 22 may fix to the bearing plate 20 opposite of the article by insertion of a pivot pin (see FIG. 6) into the pivot hole 24. Upon registry of the wheel mount 22 and the bearing plate 20, the pivot hole 24 aligns among the wheel mount 22 and the bearing plate 20, extending from the bottom of the wheel mount 22 through the top of the bearing plate 20.

The wheel mount 22 may be injection molded as a single unit, similar to the bearing plate 20, comprising a system of structure walls 28 defining a series of recesses 30 and may comprise non-magnetic material. The upper mount member 32 further comprises a set of two wings 50 extending laterally to each of the opposite sides of the pivot hole 24 of the wheel mount 22. The walls 28 may further define two wheel mount magnet housings 52, adapted to define a housing to support a magnet. The lower member 34 extends from the upper member 32 opposite of the bearing plate 20, disposed on opposite sides of the wheel 36. The lower member 34 may further comprise a slot 54 on either side of the wheel 36, accepting the insertion of an axle (not shown), normal to the pivot holes 24, about which the wheel 36 may rotate.

Figure 4:
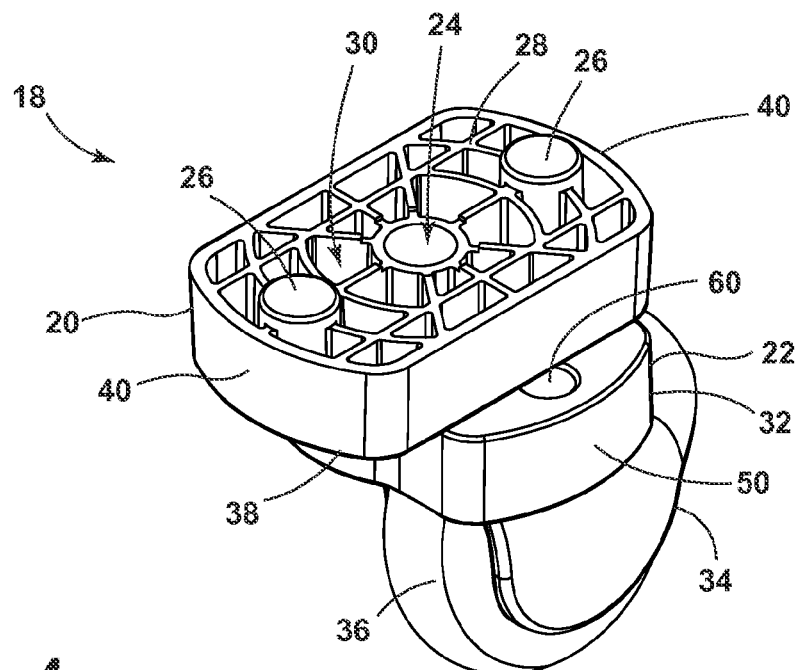
FIG. 4 illustrates a top perspective view of the caster wheel having the wheel mount pivoted about the pivot hole from registry with the bearing plate.
Figure 5:
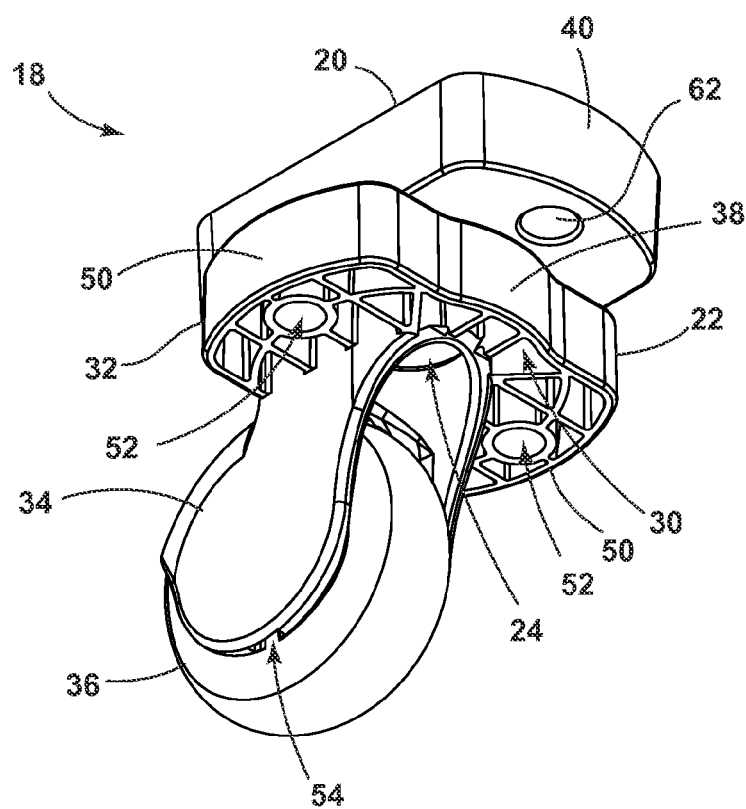
FIG. 5 illustrates a bottom perspective view of the caster wheel having the wheel mount pivoted about the pivot hole from registry with the bearing plate.

Turning to FIGS. 4 and 5, the bearing plate 20 has been rotated ninety-degrees, out of registry with the wheel mount 22, while the positioned alignment of the pivot hole 24 remains the same. In FIG. 4, the rotated bearing plate 20 exposes a wheel mount magnet 60 disposed within the wheel mount 22. The wheel mount magnet 60 is inserted in the wing 50 of the wheel mount 22 above the wheel mount magnet housings 52. Each wing 50 similarly contains a wheel mount magnet 60 while only one is visible.

In FIG. 5, a bearing plate magnet 62 is exposed within the bearing plate 20. The bearing plate magnet 62 is disposed within the magnet housing 26 of the bearing member 40. Each bearing member 40 similarly contains a bearing plate magnet 62 while only one is visible. Returning briefly to FIGS. 2 and 3, as may be appreciated, when the bearing plate 20 and the wheel mount 22 are in registry with one another, the bearing plate magnets 62 and the wheel mount magnets 60 are aligned in registry with one another as well.

Figure 6:
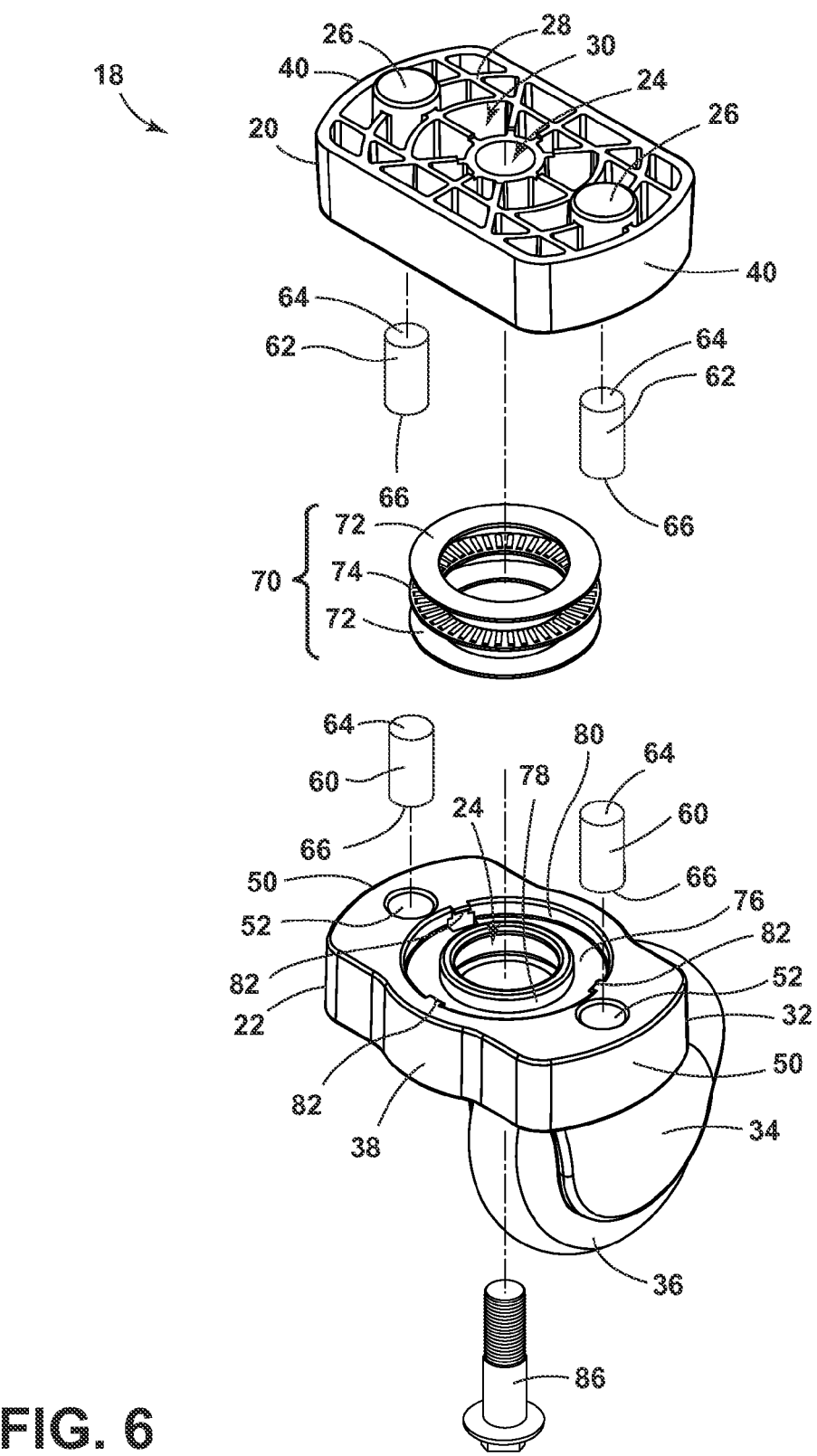
FIG. 6 illustrates an exploded view of the caster wheel.

Turning to FIG. 6, the bearing plate 20 couples to the wheel mount 22 with a pivot pin 86 inserted through the pivot holes 24 of the bearing plate 20 and the wheel mount 22 and rotatably mounted to the bearing plate. The pivot pin 86 may further extend fully through wheel mount 22 and the bearing plate 20, extending into and coupling to the article, mounting the caster wheel 18 to the article. In one variation, screws may extend through the recesses 30 of the bearing plate 20, mounting the bearing plate 20 to the article.

The wheel mount 22 further comprises two wheel mount magnet housings 52 adapted to house two wheel mount magnets 60. Each wheel mount magnet 60 comprises a positive magnetic pole 64 and a negative magnetic pole 66, having the positive magnetic pole 64 facing upward toward the bearing plate 20.

The bearing plate 20 comprises two bearing plate magnets 62, each also having a positive magnetic pole 64 and a negative magnetic pole 66. The bearing plate magnets 62 are disposed within the bearing plate 20 such that the negative magnetic pole 66 faces downward toward the wheel mount 22. The orientation of the magnetic poles, as shown, is exemplary. In variations, the magnetic poles of the wheel mount magnets 60 and the bearing plate magnets 62 may vary, as long as opposite poles are aligned when the bearing plate 20 and the wheel mount 22 are in registry.

The upper member 32 of the wheel mount 22, surrounding the pivot hole 24, comprises a circular thrust bearing channel 76 defined by an inner thrust bearing wall 78 and an outer thrust bearing wall 80. The outer thrust bearing wall 80 has a set of three segments 82 extending inwardly above the thrust bearing channel 76 for securing a thrust bearing 70 within the thrust bearing channel 76. The thrust bearing 70 comprises a set of two washers 72 with a roller-bearing cage assembly 74 sandwiched between the washers 72. The thrust bearing 70 facilitates pivoting movement of the wheel mount 22 relative to the bearing plate 20 while simultaneously supporting the weight of an article.

Figure 7:
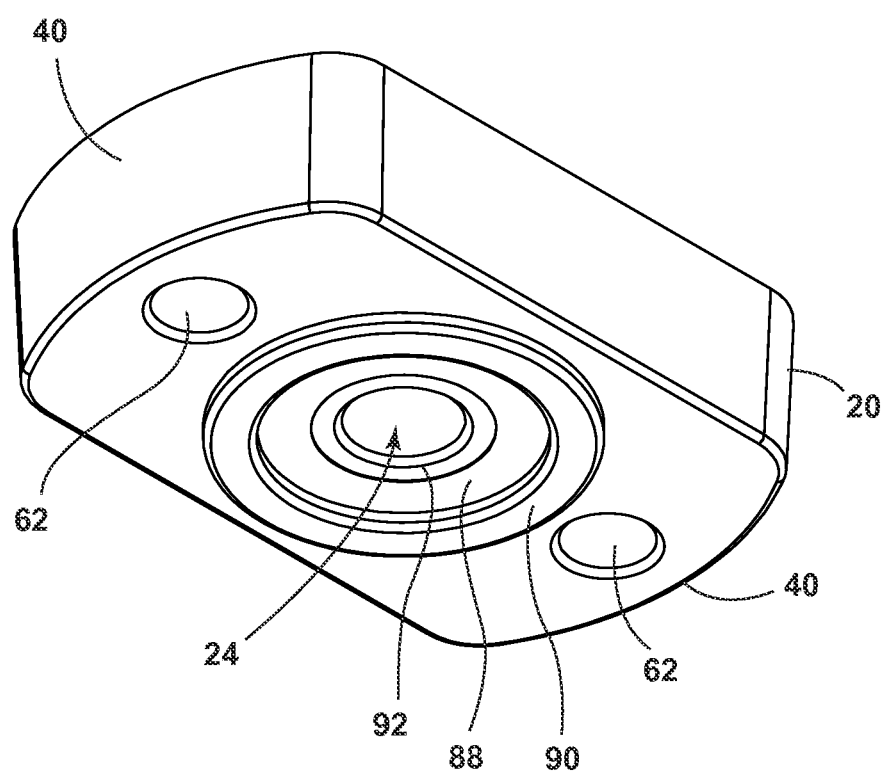
FIG. 7 illustrates a bottom perspective view of the bearing plate.

Turning to FIG. 7, the underside of the bearing plate 20 is visible, further comprising a clearance recess 88 defined by an outer bearing wall 90 and an inner bearing wall 92, surrounding the pivot hole 24. As may be appreciated, upon alignment of the pivot holes 24 disposed within both the bearing plate 20 and the wheel mount 22, the thrust bearing channel 76 aligns with the outer bearing wall 90, having the thrust bearing 70 contained within the thrust bearing channel 76 and the outer bearing wall 90.

Figure 8:
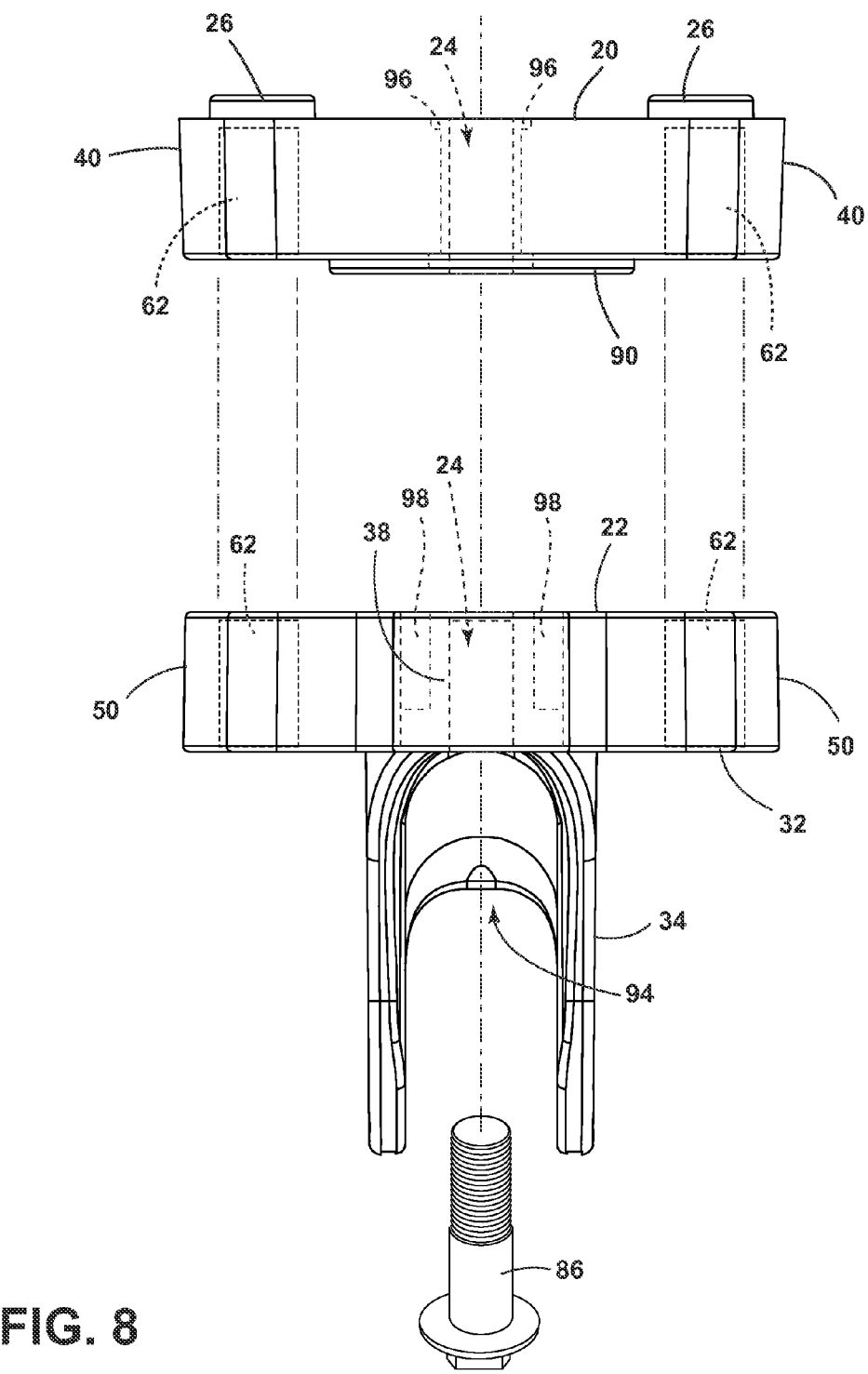
FIG. 8 illustrates an exploded view of the bearing plate and the wheel mount in registry.

In FIG. 8, an exploded view shows the alignment of the bearing plate magnets 62 and the wheel mount magnets 60 when the bearing plate 20 and the wheel mount 22 are in registry with one another. The wheel has been removed from the wheel mount 22, creating a wheel cavity 94 within the lower member 34. When in registry, the magnets 60, 62 align, pulling towards one another with magnetic attraction. In a preferred embodiment, the aligned magnets 60, 62 may be situated 1.0 millimeters apart, providing an optimal balance between magnetic attractive force, and spacing, allowing the wheel mount 22 to easily pivot upon moving the article laterally. In further embodiments, the magnets 60, 62 may be situated further from one another than 1.0 millimeters or may be closer, even physically abutting one another upon registry of the wheel mount 22 and the bearing plate 20.

The pivot hole 24 of the bearing plate 20 may further comprise a flanged bushing 96 pressed into the bearing plate 20, disposed on the inner surface of the inner bearing wall 92 of FIG. 7. The wheel mount 22 may further comprise an insert-molded, flanged roller bearing 98, complementary to the flanged bushing 96, aligned on the inner surface of the inner thrust bearing wall 78 of FIG. 6. Both the flanged bushing 96 and the flanged roller bearing 98 serve to align bearing surfaces of the bearing plate 20 and the wheel mount 22 for insertion of the pivot pin 86.

In operation, the wheel mount may pivot in reference to the bearing plate as the article moves. When the bearing plate and wheel mount are in registry, the article will orient to a first direction, preferably in a straight direction relative to the article, while any direction is contemplated. The caster wheels maintain article orientation in the straight direction by utilizing the magnetically attractive forces between the bearing plate magnets and the wheel mount magnets. While shifting the article laterally, the wheel mount will rotate, removing the wheel mount from registry with the bearing plate. As the article completes a turn, the magnetic forces among the magnets will attract the wheel mount, which tends to pivot back into registry with the bearing plate, returning article alignment to a first, straight direction.

Both the bearing plate magnets and the wheel mount magnets may each have similarly aligned polarities, respectively, such that the two, bearing-plate-magnet polarities will be opposite to the adjacent wheel-mount-magnet polarities. Such alignment of polarities permits the wheel mount to rotate 180-degrees into registry, while remaining oriented in the same first direction. This polarity alignment may be advantageous for wheels which may rotate beyond 90-degrees during article movement, which may otherwise hinder the return of the wheel mount into registry with the bearing plate.

In a variation, the bearing plate magnets and the wheel mount magnets may be oppositely oriented based upon positive and negative polarity. For example, one bearing plate magnet will have a downward, positive polarity while the other bearing plate magnet will have a downward, negative polarity. Similarly, the wheel mount will have oppositely oriented magnetic polarities among the wheel mount magnets. In this embodiment, only a single orientation of the wheel mount will place the magnets into registry with one another. Specifically, the magnets, being in registry, may only orient the caster wheel in a forward first direction. Upon rotation of the wheel mount by 180-degrees, similarly charged poles of the magnets will be aligned with one another, such as a positive pole to another positive pole, magnetically repelling one another. This orientation permits only a single registry orientation between set of magnets and may be advantageous for directing an article in a first forward direction while preventing movement in a separate backward direction, for example, if utilized with a braking system. In this example, the magnetic repulsion of the 180-degree rotation of the wheel mount prevents the caster wheel from orienting itself in a backward direction, potentially circumventing a backward braking system.

While the invention has been described in connection with certain specific embodiments thereof, it is to be understood that this is by way of illustration and not of limitation. Reasonable variation and modification are possible within the scope of the forgoing disclosure and drawings without departing from the spirit of the invention, which is defined in the appended claims.

What is claimed is:

1. A caster wheel comprising:
    a wheel mount having a wheel rotatably mounted to an axle secured to the wheel mount, an upper mount member having a wing extending laterally from each of opposite sides of the wheel mount, and a pivot pin extending normal to the axle through the upper mount member;
    a bearing plate adapted to affix to an article, wherein the pivot pin is rotatably mounted to the bearing plate;
    at least two wheel mount magnets mounted in the upper mount member, with one wheel mount magnet in each wing; and
    at least two bearing plate magnets mounted in the bearing plate, wherein each bearing plate magnet is positioned to be in registry with a wheel mount magnet when the wheel mount is pivoted relative to the bearing plate with the wheel pointed in a first direction;
    wherein the poles of the wheel mount magnets are opposite from the poles of the bearing plate magnets with which they are in registry so that the wheel mount will tend to pivot relative to the bearing plate to maintain the wheel pointed in the first direction.

2. The caster wheel of claim 1 wherein at least one of the wheel mount magnets and bearing plate magnets are earth magnets.

3. The caster wheel of claim 2 wherein the wheel mount magnets and the bearing plate magnets are cylinders.

4. The caster wheel of claim 3 wherein at least one of the bearing plate magnets and the wheel mount magnets have a diameter of 0.50 inches and have a length of 0.75 inches.

5. The caster wheel of claim 1 wherein the wheel mount is molded in a single unit.

6. The caster wheel of claim 5 wherein the bearing plate is molded in a single unit.

7. The caster wheel of claim 6 wherein the wheel mount comprises a non-magnetic material.

8. The caster wheel of claim 7 wherein the bearing plate comprises a non-magnetic material.

9. The caster wheel of claim 1 wherein when the wheel mount magnets and bearing plate magnets are in registry, the magnets in registry are spaced 1.0 millimeters apart.

10. An article of furniture having caster wheels, wherein at least one caster wheel comprises:
    a wheel mount having a wheel rotatably mounted to an axle secured to the wheel mount, an upper mount member having a wing extending laterally from each of opposite sides of the wheel mount, and a pivot pin extending normal to the axle through the upper mount member;
    a bearing plate adapted to affix to an article, wherein the pivot pin is rotatably mounted to the bearing plate;
    at least two wheel mount magnets mounted in the upper mount member, with one wheel mount magnet in each wing; and
    at least two bearing plate magnets mounted in the bearing plate, wherein each bearing plate magnet is positioned to be in registry with a wheel mount magnet when the wheel mount is pivoted relative to the bearing plate with the wheel pointed in a first direction;
    wherein the poles of the wheel mount magnets are opposite from the poles of the bearing plate magnets with which they are in registry so that the wheel mount will tend to pivot relative to the bearing plate to maintain the wheel pointed in the first direction.

11. The at least one caster wheel of claim 10 wherein at least one of the wheel mount magnets and bearing plate magnets are earth magnets.

12. The at least one caster wheel of claim 11 wherein the wheel mount magnets and the bearing plate magnets are cylinders.

13. The at least one caster wheel of claim 12 wherein at least one of the bearing plate magnets or the wheel mount magnets have a diameter of 0.50 inches and have a length of 0.75 inches.

14. The at least one caster wheel of claim 10 wherein the wheel mount is molded in a single unit.

15. The at least one caster wheel of claim 14 wherein the bearing plate is molded in a single unit.

16. The at least one caster wheel of claim 15 wherein the wheel mount comprises a non-magnetic material.

17. The at least one caster wheel of claim 16 wherein the bearing plate comprises a non-magnetic material.

18. The at least one caster wheel of claim 10 wherein when the wheel mount magnets and bearing plate magnets are in registry, the magnets in registry are spaced 1.0 millimeters apart.

* * * * *